(12) United States Patent
Giuseppe

(10) Patent No.: US 6,518,722 B1
(45) Date of Patent: Feb. 11, 2003

(54) CONTROL SYSTEM, OBSERVER, AND CONTROL METHOD FOR A SPEED-SENSORLESS INDUCTION MOTOR DRIVE

(75) Inventor: Guidi Giuseppe, Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/884,552

(22) Filed: Jun. 19, 2001

(30) Foreign Application Priority Data

Apr. 27, 2001 (JP) ........................... 2001-133159

(51) Int. Cl.$^7$ ................................. H02P 7/36
(52) U.S. Cl. .................... 318/727; 318/432; 318/799
(58) Field of Search ............................ 318/727, 432, 318/799

(56) References Cited

U.S. PATENT DOCUMENTS 5,559,419 A * 9/1996 Jansen et al. ............... 318/804
5,701,066 A * 12/1997 Matsuura et al. ........... 318/432
6,184,638 B1 * 2/2001 Kinpara ...................... 318/432

OTHER PUBLICATIONS

H. Kubota et al.; "DSP–Based Speed Adaptive Flux Observer of Induction Motor"; *IEEE Transactions on Industry Application,* vol. 29, No. 2, pp. 343–348; 1993.
Y. Kinpara and M. Koyama; "Speed Sensorless Vector Control Method of Induction Motor Including A Low Speed Region"; *The Journal "D" of the Institute of Electrical Engineers of Japan,* vol. 120–D, No. 2, pp. 223–229; 2000.

* cited by examiner

*Primary Examiner*—Rita Leykin
(74) *Attorney, Agent, or Firm*—Greer, Burns & Crain, Ltd.

(57) ABSTRACT

A feedback gain K is determined by using an estimation error $e_i$ of a stator current, and an observed flux and an estimated speed are obtained and output based on the feedback gain K. An induction motor is controlled based on the observed flux and the estimated speed. In this way, a control system, an observer, and a control method, which realize a global stable control of an induction motor drive that does not comprise a speed sensor and/or a rotational position sensor, are implemented.

12 Claims, 5 Drawing Sheets

CONTROL SYSTEM, OBSERVER, AND CONTROL METHOD FOR A SPEED-SENSORLESS INDUCTION MOTOR DRIVE

BACKGROUND OF THE INVENTION

1. Field of the Invention

The present invention relates to an induction motor drive without a speed sensor and/or a rotational position sensor, and more particularly, to an observer for vector-controlling an induction motor drive.

2. Description of the Related Art

A typical vector control system for a direct field-oriented induction motor drive without a speed sensor and/or rotational position sensor is shown in FIG. 1.

In the system without a speed sensor, only a stator voltage 206 and a stator current 207 are detected by sensors 108 and 109.

Vector control for an induction motor 100 in this figure is performed based on the torque of the induction motor 100, which is independently applied, and the magnetic flux fed by an inverter 101.

With the vector control in the system shown in this figure, a speed regulator 107 generates a torque current reference 202 under PI control (proportional action and integral action control) from a an estimated speed reference 200 being an instruction of the speed of the motor, and an estimated speed 211 from a flux and speed observer 110 as a feedback, and outputs the generated torque current reference 202 to a current regulator 106. The current regulator 106 outputs a current that is regulated under the PI control from the torque current reference 202 being an instruction to the torque and a flux current reference 201 being an instruction to the magnetic flux. Then, a vector rotator 104 transforms this current value into a relative value in a coordinate system (d-q coordinate system) that rotates in synchronization with a synthesized current vector, and applies the transformed value to the inverter 101 as a primary voltage command 205. The flux current reference 201 applied to the current regulator 106 can be set to a constant value over a wide operation range while the torque current reference 202 is generated by a PI loop according to the estimated speed 211.

The voltage and the current values applied from the inverter 101 to the induction motor 100 are detected as the detected voltage 206 and the detected current 207 by the sensors 108 and 109. After the detected voltage 206 and the detected current 207 are transformed into values represented by a two-phase coordinate system by 3-2 phase transformers 102 and 103, they are input to the flux and speed observer 110 as space vector values $v_s$ 208 and $i_s$ 209.

The flux and speed observer 110 obtains an observed rotor flux 210 from the stator voltage $v_s$ 208 and the stator current $i_s$ 209, outputs the obtained flux 210 to vector rotators 104 and 105, estimates a rotor speed, and outputs the estimated speed 211 to the speed regulator 107.

The vector rotator 104 vector-rotates a flux command 203 and a torque command 204 in the orientation of the rotor flux based on the observed rotor flux 210, and outputs the vector-rotated commands to the inverter 101 as the primary voltage instruction 205.

Additionally, the vector $i_s$ 209 is vector-rotated by the vector rotator 105 in the orientation of the rotor flux based on the observed flux 210 from the flux and speed observer 110 in order to obtain a flux current 212 and a torque current 213, which are used as feedback signals by the current regulator 106.

An MRAS (Model Reference Adaptive System) based on a flux and speed observer was initially proposed by Ref. 1.

Ref. 1: H. Kubota et al. "DSP-based speed adaptive flux observer of induction motor", IEEE Trans. Industry Applicat., vol. 2, no. 2 pp. 343–348, 1993.

According to Ref. 1, a stator current and a rotor flux are used as an independent set of variables in order to explain an induction motor. Accordingly, an equation for an induction motor, which is demonstrated by Ref. 1, can be rewritten to an equation using a stator flux and a rotor flux as state variables. Since the process of this rewrite is a standard linear transformation, it is omitted here.

A classical representation of an induction machine in a stator oriented reference coordinate system ($\alpha$-$\beta$) using a state space notation is as follows.

$$\begin{cases} \dfrac{d}{dt}\begin{pmatrix}\phi_s\\ \phi_r\end{pmatrix} = \begin{pmatrix} -R_s L_{sg} I & R_s L_{mg} I \\ R_r L_{mg} I & -R_r L_{rg} I + \omega_r J \end{pmatrix} \cdot \begin{pmatrix}\phi_s\\ \phi_r\end{pmatrix} + \begin{pmatrix} I \\ 0 \end{pmatrix} \cdot v_s = Ax + Bu \\ i_s = (L_{sg} I - L_{mg} I) \cdot \begin{pmatrix}\phi_s\\ \phi_r\end{pmatrix} = Cx \end{cases} \quad (1)$$

where:

$$\phi_s = [\phi_{s\alpha}\ \phi_{s\beta}]^T,\ \phi_r = [\phi_{r\alpha}\ \phi_{r\beta}]^T,\ i_s = [i_{s\alpha}\ i_{s\beta}]^T,\ v_s = [v_{s\alpha}\ v_{s\beta}]^T$$

are space vectors associated with a stator flux, a rotor flux, a stator current, and a stator voltage respectively.

Other symbols are as follows.

$$L_{sg} = \frac{1}{\sigma \cdot L_s} = \frac{L_r}{L_s \cdot L_r - L_m^2}$$

$$L_{rg} = \frac{1}{\sigma \cdot L_r} = \frac{L_s}{L_s \cdot L_r - L_m^2}$$

$$L_{mg} = \frac{1-\sigma}{\sigma \cdot L_m} = \frac{L_m}{L_s \cdot L_r - L_m^2}$$

$$I = \begin{bmatrix}1 & 0\\ 0 & 1\end{bmatrix};\quad J = \begin{bmatrix}0 & -1\\ 1 & 0\end{bmatrix};\quad 0 = \begin{bmatrix}0 & 0\\ 0 & 0\end{bmatrix};$$

$R_s$, $R_r$: Stator and rotor resistance;
$L_s$, $L_r$, $L_m$: Stator, rotor, and mutual inductance;
$\sigma = 1 - L_m^2/(L_s \cdot L_r)$: Total leakage coefficient;
$\omega_r$: Angular rotor speed.

Furthermore, according to Ref. 1, observed flux values are represented as follows. Note that observation and an observed value referred to in this specification represent observation and an observed value in modern control theory, and indicate the estimation of a state variable value from an output and its estimated value. In the following equation, observed values are marked with "^".

$$\begin{cases} \dfrac{d}{dt}\begin{pmatrix}\hat\phi_s\\ \hat\phi_r\end{pmatrix} = \begin{pmatrix} -R_s L_{sg} I & R_s L_{mg} I \\ R_r L_{mg} I & -R_r L_{rg} I + \hat\omega_r J \end{pmatrix} \cdot \begin{pmatrix}\hat\phi_s\\ \hat\phi_r\end{pmatrix} + \begin{pmatrix} I \\ 0 \end{pmatrix} \cdot v_s + \\ \begin{pmatrix} k_1 I + k_2 J \\ k_3 I + k_4 J \end{pmatrix} \cdot (\hat i_s - i_s) = \hat A \hat x + Bu + K e_i \\ \hat i_s = (L_{sg} I - L_{mg} I) \cdot \begin{pmatrix}\hat\phi_s\\ \hat\phi_r\end{pmatrix} = C \hat x \end{cases} \quad (2)$$

An output feedback gain K in the equation (2) is used to modify the dynamic characteristics of an estimation error and its determination.

The speed is evaluated with the following equation.

$$\frac{d}{dt}\hat{\omega}_r = k_\omega \cdot (\hat{i}_s - i_s) \times \hat{\phi}_r = k_\omega \cdot \hat{\phi}_r^T \cdot J \cdot e_i \qquad (3)$$

where $k_\omega$ is an arbitrary gain.

According to Ref. 1, the feedback gain K in the observer equation (2) is used along with a constant of proportionality k in order to obtain four eigenvalues $\lambda_{obs}$ of the flux observer represented by the equation (2), which are proportional to an eigenvalue $\lambda_{mot}$ of the corresponding motor represented by the equation (1).

$$\lambda_{obs} = k \cdot \lambda_{mot} \qquad (4)$$

The equation (4) is proved in the following document.

Ref. 2: Y. Kinpara and M. Koyama, "Speed Sensorless Vector Control Method of Induction Motor Including A Low Speed Region," The Journal "D" of the Institute of Electrical Engineers of Japan, vol. 120-D, no. 2, pp. 223–229, 2000.

With a selection method for a feedback gain K, which is proposed by Ref. 2, several unstable operation conditions are imposed on the induction motor. Especially, when a stator frequency approaches "0", an observer does not converge, leading to inability of the operations of the motor drive.

An unstable region on a torque-speed plane of the induction motor drive depends on the value of the constant of proportionality k in the equation (4). This unstable area converges to a single line corresponding to the primary frequency that is exactly "0" when the constant k converges to "0". Accordingly, the dynamic characteristics resultant from the flux observer become unacceptably slow for a very small value of k. Therefore, this selection method for the feedback gain K is not a good solution.

Ref. 2 proposes a method based on a Riccati equation as a selection method for the output feedback gain K in the equation (2), which stabilizes the drive.

With this method, if G, Q, and R are defined as follows $$G = \begin{bmatrix} 0 & 0 \\ 0 & J \end{bmatrix}; \qquad Q = \begin{bmatrix} I & 0 \\ 0 & I \end{bmatrix};$$

the output feedback gain K is obtained with the following equation.

$$K = PC^T R^{-1}$$

where P is a sole positive definite solution that satisfies the following equation.

$$PA^T + AP - PC^T R^{-1} CP + GQG^T = 0$$

With the method using the Riccati equation, the stability of the flux and speed observer is improved, but one arbitrary parameter ($\epsilon_1$) that is not directly related to the stability of a global operation must be selected to obtain the output feedback gain. If this parameter is unsuitably selected, the observer can possibly be made unstable or an unacceptably large delay can possibly be caused. In either case, a resultant operation cannot run at a very low primary frequency.

SUMMARY OF THE INVENTION

The present invention was developed to overcome the above described problems, and aims at providing a control system, an observer, and a control method for an induction motor drive without a speed sensor or a position sensor, the operations of which are stable for global operation frequencies.

The present invention assumes a device or a method performing vector control for an induction motor that does not comprise at least either a speed sensor or a position sensor.

The control system according to the present invention comprises an observer unit and a control unit.

The observer unit determines a feedback gain K by using an estimation error of a stator current, and obtains and outputs at least either of an observed magnetic flux and an estimated speed based on the feedback gain K.

The control unit controls the induction motor based on the output of the observer unit.

With this system, only the restriction on the determination of the feedback gain K is, for example, an equation $$\lim_{\omega \to 0} \angle G_l(j\omega) = \infty$$

That is, the feedback gain K which satisfies a condition based on a different factor can be determined with almost no restrictions.

Furthermore, the observer unit can be configured to determine the feedback gain K the magnitude of which is within a predetermined range, if the rotation speed of the induction motor is equal to or higher than a preset speed.

With this configuration, a stable operation can be realized even at an operating frequency in the vicinity of "0".

DESCRIPTION OF THE PREFERRED EMBODIMENTS

Preferred embodiments according to the present invention will be explained below with reference to the drawings.

The present invention adopts several results established so far in non-linear control theory. In consequence, a feedback gain K that ensures the stability of a flux and speed observer under every possible operating condition can be obtained without much degrading the dynamic characteristics of the observer.

Since the feedback gain K is obtained as a very simple function of almost no motor parameters and operating speed, its realization and implementation can be made with significant ease. Furthermore, unlike the methods proposed so far, a feedback gain the value of which does not become infinite can be derived even if the primary frequency approaches "0", according to the present invention (singular condition).

If an error of an angular rotor speed is set as $\Delta\omega_r = \hat{\omega}_r - \omega_r$, an estimation error $e_i = \hat{i}_s - i_s$ of an estimated stator output current becomes as follows from the equations (1) and (2):

$$e_i = Ce = C(sI_4 - A - KC)^{-1}(_I{}^0)(-(\hat{\omega}_r - \omega_r)J\hat{\phi}_r) = G_l(s) \cdot (-\Delta\omega_r J\hat{\phi}_r) \quad (5)$$

where s is a Laplace operator.

Figure 2:
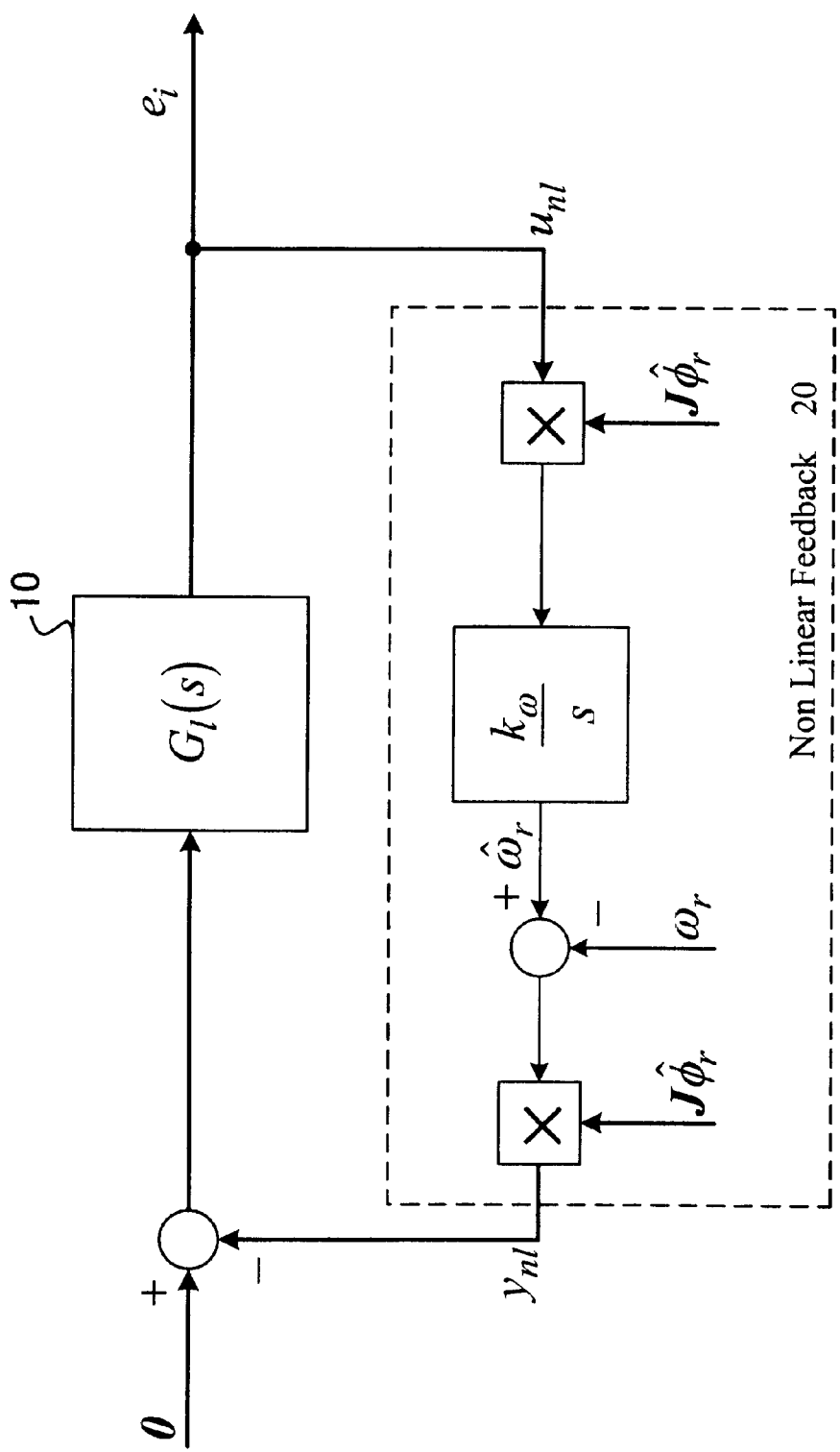
FIG. 2 exemplifies an output error block according to a preferred embodiment of the present invention.

FIG. 2 exemplifies an output error block satisfying the equation (5).

As exemplified in FIG. 2, a stator current estimation error system can be recognized as an interconnection of a non-linear feedback transfer function and a linear transfer function.

If the following two conditions are satisfied in this figure, the flux and speed observer is stabilized.

Condition 1: A non-linear feedback 20 shown in FIG. 2 satisfies the Popov's inequality that is well known as a stability determination method for a non-linear control system. Namely, a constant γ which is not dependent on a time t exists, and the following inequality is satisfied for every $t_1 > t_0$.

$$\int_0^{t_1} u_{nl}^T(\tau) \cdot y_{nl}(\tau) d\tau \geq -\gamma^2 \quad (6)$$

Condition 2: A linear transfer function $G_l(s)$ of a linear steady-state block 10 shown in FIG. 2 is stable, and a phase angle between an input and an output falls within a range of $\pm\pi/2$.

Since mechanical constituent elements have relatively slow dynamic characteristics as for Condition 1, it becomes easy to implement $u_{nl} = e_i$, $y_{nl} = \hat{\omega}_r J\hat{\phi}_r$ in FIG. 2, if an actual speed is assumed to be nearly constant.

The following equation can be derived from the above provided equations (3) and (6).

$$u_{nl}^T y_{nl} = \frac{k_\omega}{s} \cdot (e_i^T J\hat{\phi}_r)^2 \quad (7)$$

It is evident that the equation (7) satisfies Popov's inequality (6), since the equation (7) includes the feedback gain K. Hence, FIG. 2 satisfies Condition 1.

Next, the linear transfer function $G_l(s)$ in the equation (5) is considered as for Condition 2.

Suppose that there is no feedback gain K (K=0) In this case, although the transfer function $G_l(s)$ becomes stable, the phase displacement between an input and an output is outside the stable range of $\pm\pi/2$ for sufficiently low frequencies, which makes the observer unstable.

Accordingly, for the stability of the system shown in FIG. 2, it is necessary to determine a gain matrix K such that the Popov's stability condition is satisfied, and the whole of a dynamic matrix (A+KC) of the flux observer itself remains stable.

The transfer function $G_l(s)$ in the equation (5) can be verified to change its sign based on a primary frequency. This reflects on the phase as follows.

$$\left| \lim_{\omega \to 0+} \angle G_l(j\omega) \right| = \alpha \Rightarrow \left| \lim_{\omega \to 0-} \angle G_l(j\omega) \right| = \pi - \alpha \quad (8)$$

This equation means that the only way to achieve the stability when the primary frequency is a small positive or negative value is to ensure the following equation.

$$\left| \lim_{\omega \to 0} \angle \overline{G}_l(j\omega) \right| = \pi/2 \quad (9)$$

This equation (9) is satisfied whenever the feedback gain K that satisfies the following equation (10) is suitably selected.

$$\lim_{\omega \to 0} \angle G_l(j\omega) = \infty \quad (10)$$

As far as the equation (10) is satisfied, any feedback gain K in the form represented by the equation (2) is acceptable, and the flux and speed observer is globally stabilized.

The feedback gain K can be defined as follows from the equation (2).

$$K = \begin{pmatrix} k_1 I + k_2 J \\ k_3 I + k_4 J \end{pmatrix} \quad (11)$$

There are four parameters ($k_1, \ldots k_4$), which can be arbitrarily set, for selecting the feedback gain K, and the only restriction on this selection is the equation (10). Therefore, many options can be proposed for a global stabilization problem, and a suitable one can be selected from among the options, according to other conditions.

This selection method for the feedback gain K can be simplified, for example, by selecting the parameters as follows.

$$k_1 = k_4 = 0 \quad (12)$$

When it is verified that the parameter $k_3$ of the feedback gain K does not affect the restriction of the equation (10), only the gain parameter $k_2$ is proved to affect the restriction of the equation (10). Therefore, the feedback gain K that always satisfies the equation (10) can be derived.

Considering this fact, the parameter $k_2$ results in the following equation (13).

$$k_2 = k_{2C} = -L_r \cdot \frac{R_s}{R_r} \cdot \omega_r \quad (13)$$

From the above discussion, the following simple equation for deriving the feedback gain K can be obtained.

$$K = \begin{pmatrix} k_{2C} J \\ 0 \end{pmatrix} \quad (14)$$

The feedback gain K that satisfies the equation (14) stabilizes the observer at any speed or at any primary frequency in which the flux and speed observer has one of its poles at the origin (stability limit) except for the singular condition that the primary frequency, is exactly "0".

It is proved from the equation (13) that the parameter $k_{2c}$ of the feedback gain K linearly becomes large with an increase in the operating speed. However, the operating frequency cannot be made very much low for a sufficiently high speed, due to the limitation of the slip of the induction machine.

To address this problem, an upper limit is set for the value of the feedback gain K, which is obtained from the equation (14), and the value is clipped to fall within a particular range if it exceeds the range. For example, an operating speed approximately twice (or three times) the rated slip $\omega_{s,rat}$ of the motor in use, such as a nominal value, etc., is defined to be a maximum value, to which clipping is made, for an angular rotor speed $\omega_r$, so that the upper limit can be set for the feedback gain K. In this way, no adverse effect is exerted on the stability of the drive at an operating frequency in the vicinity of "0".

Which ever value the parameter $k_3$ of the feedback gain K takes, the equation (10) is satisfied. Therefore, the selection of the parameter $k_3$ can be used to improve the dynamic characteristics or the stability margin of the flux and speed observer represented by the equation (2).

Any standard technique may be available as the selection of the parameter $k_3$. For instance, the parameter $k_3$ can be obtained by linearizing a system that is configured by the motor represented by the equation (1) and the observer represented by the equation (2) in the vicinity of an equilibrium operating point, or by using many tools that can be obtained from the established linear control theory.

Whichever value is selected for the parameter $k_3$, the observer remains stable globally as far as the other parameters of the gain K, which are obtained from the equations (12) and (13), are not changed.

Figure 3:
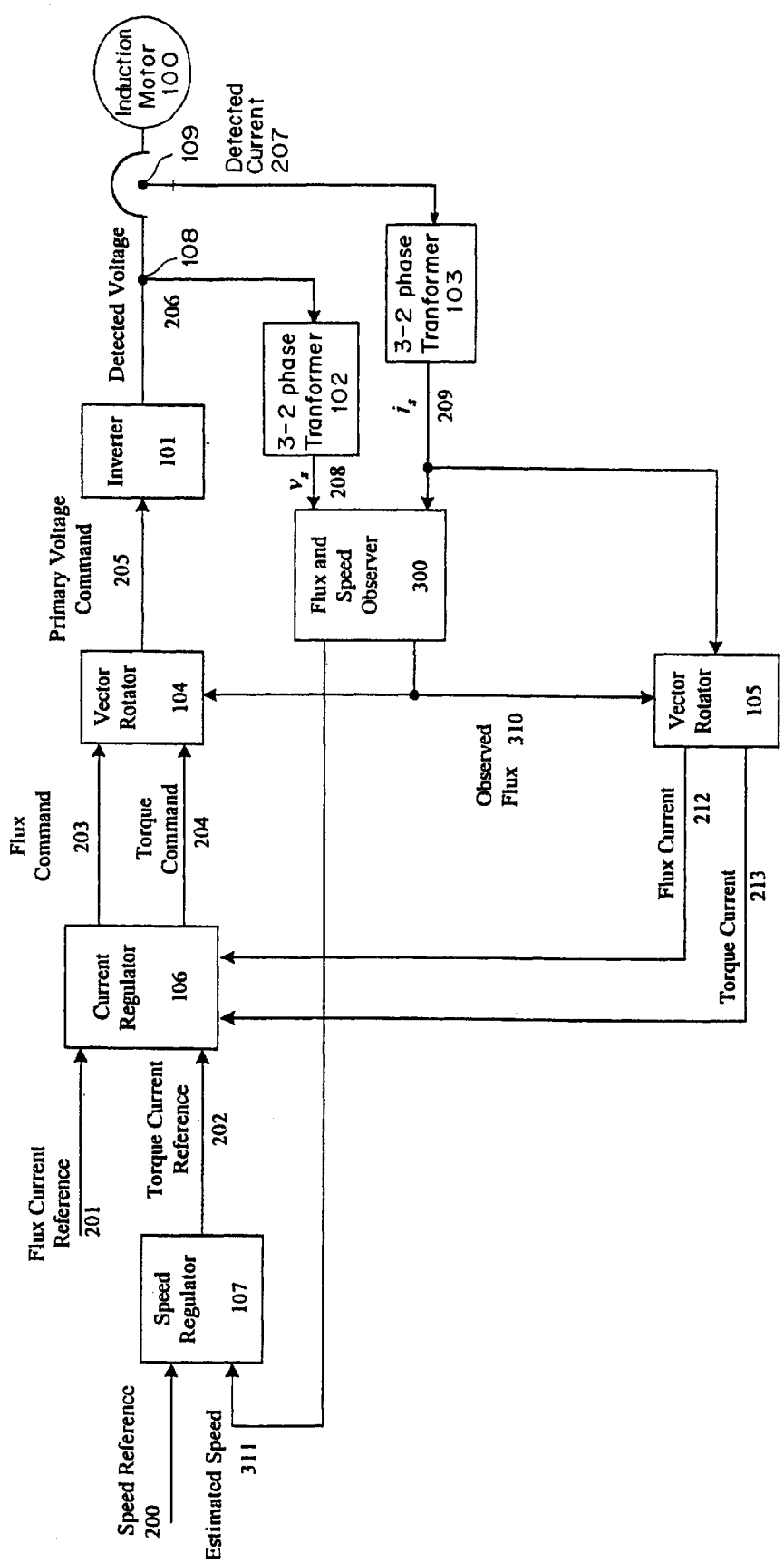
FIG. 3 shows a system of a direct field-oriented induction motor drive without a speed sensor or a rotational position sensor according to the preferred embodiment.

FIG. 3 shows the control system for a direct field-oriented induction motor drive without a speed sensor and/or a rotational position sensor, according to this preferred embodiment.

Figure 1:
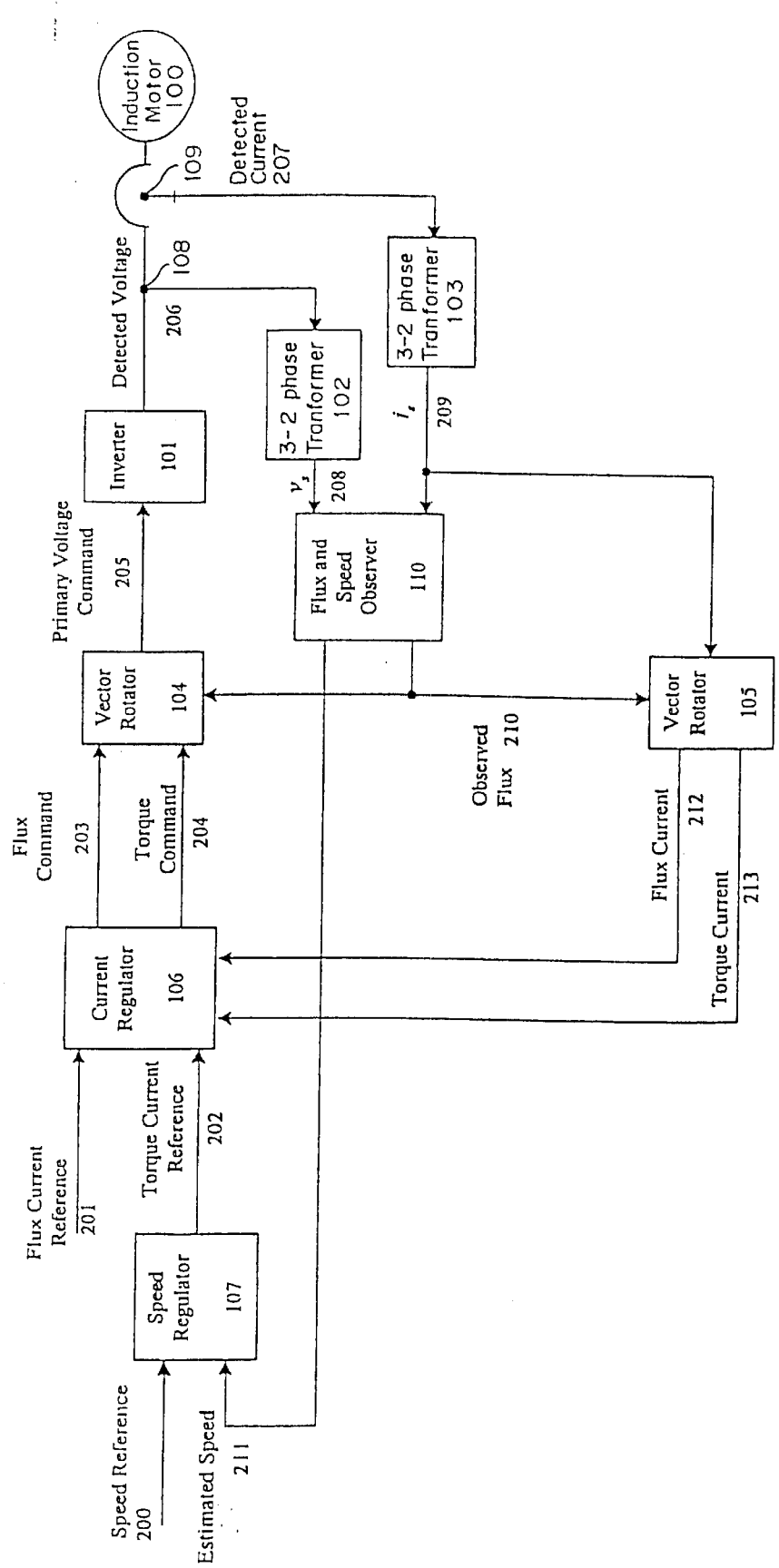
FIG. 1 shows a typical system of a direct field-oriented induction motor drive without a speed sensor and/or rotational position sensor.

Comparing with the system configuration shown in FIG. 1, a flux and speed observer 300 is arranged in the configuration shown in FIG. 3 as a replacement of the flux and speed observer 100. In this figure, the same constituent elements as those of the conventional system shown in FIG. 1 are denoted with the same reference numerals, and their operations are fundamentally the same as those explained with reference to FIG. 1.

The globally stable flux and speed observer 300 according to this preferred embodiment is used in a standard direct vector control mechanism. The flux and speed observer 300 obtains an observed rotor flux 301, which is used by vector rotators 104 and 105 as a field orientation, with the use of a voltage vector $v_s$ 208 and a current vector $i_s$ 209 that are transformed from a detected voltage 206 and a detected current 207, which are measured by the sensors 108 and 109, into a two-phase coordinate system by 3-2 phase transformers 102 and 103, and outputs the obtained flux to the vector rotators 104 and 105. The flux and speed observer 300 is configured as a single unit in the configuration shown in FIG. 3. However, the flux and speed observer 300 may be arranged separately as a flux observer and a speed observer.

Additionally, the flux and speed observer 300 obtains and outputs an estimated rotor speed 311 from the voltage vector $v_s$ 208 and the current vector $i_s$ 209. The estimated rotor speed 311 is used as an external speed control loop 211 for a speed regulator 107.

Figure 4:
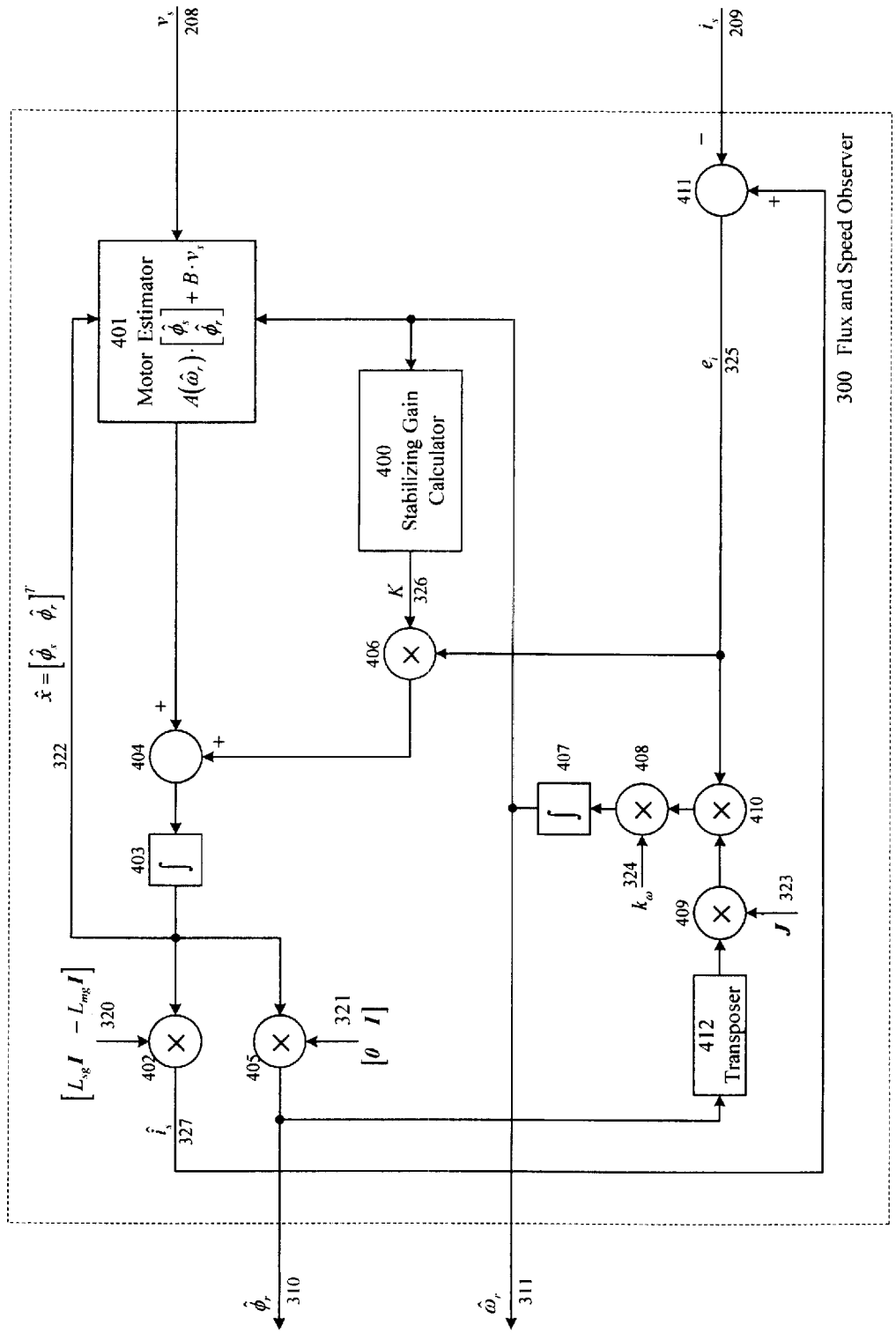
FIG. 4 exemplifies the configuration of a flux and speed observer.

FIG. 4 exemplifies the configuration of the flux and speed observer 300 shown in FIG. 3.

In the configuration shown in FIG. 4, the observed rotor flux 310 and the estimated rotor speed 311 are obtained from the voltage vector $v_s$ 208 and the current vector $i_s$ 209 based on the above provided equations (2) and (3), and output.

In the flux and speed observer 300, an arithmetic operation unit 411 calculates the difference between an input measured current vector $i_s$ 209 and an observed value 327 that the flux and speed observer 300 itself calculates, and outputs the calculated difference to multipliers 406 and 410 as an estimation error $e_i$ 325 of the stator current.

The multiplier 406 multiplies the estimation error $e_i$ 325 and the feedback gain K obtained by a stabilizing gain calculator 400 to be described later, and outputs the result of the multiplication to an adder 404.

Additionally, in the flux and speed observer 300, a motor estimator 401 obtains the values of the first and the second terms in the equation (2) from the input voltage vector $v_s$ 208 and the estimated rotor speed 311 that the flux and speed observer 300 itself calculates. Then, the adder 404 outputs the value obtained by adding the value of the third term $Ke_i$ input from the multiplier 406 to the sum of the first and the second terms in the equation (2) from the motor estimator 401. This value is integrated by an integrator 403.

The output of the integrator 403 is input to multipliers 402 and 405, and the motor estimator 401. The motor estimator 401 uses the output of the integrator 403 to obtain the first term of the equation (2). The multiplier 402 multiplies the output of the integrator 403 and a fixed value matrix $[L_{sg}I-L_{mg}I]$, which is dependent on the characteristics of the motor, so as to obtain the observed value 327 of the stator current, which is used by the arithmetic operation unit 411 to obtain the estimation error $e_i$ 325 of the stator current. The multiplier 405 multiplies the output of the integrator 403 and a matrix [0(0 matrix) I] so as to generate an output value 310.

The multiplier 410 multiplies the estimation error $e_i$ 325 of the stator current, and the result of the multiplication, which is output from the multiplier 409, of the observed rotor flux 310 transposed by a transposer 412 and a matrix J 323, and outputs the result of the multiplication to a multiplier 408. The multiplier 408 multiplies this value and an arbitrary positive gain $k_\omega$ in the equation (3). An integrator 407 integrates this result to obtain the estimated rotor speed 311.

The stabilizing gain calculator 400 obtains the feedback gain K 326 for stabilization, which satisfies the equation (10), from the estimated rotor speed 311 that the flux and speed observer 300 itself calculates and fixed parameters indicating the characteristics of the motor.

Figure 5:
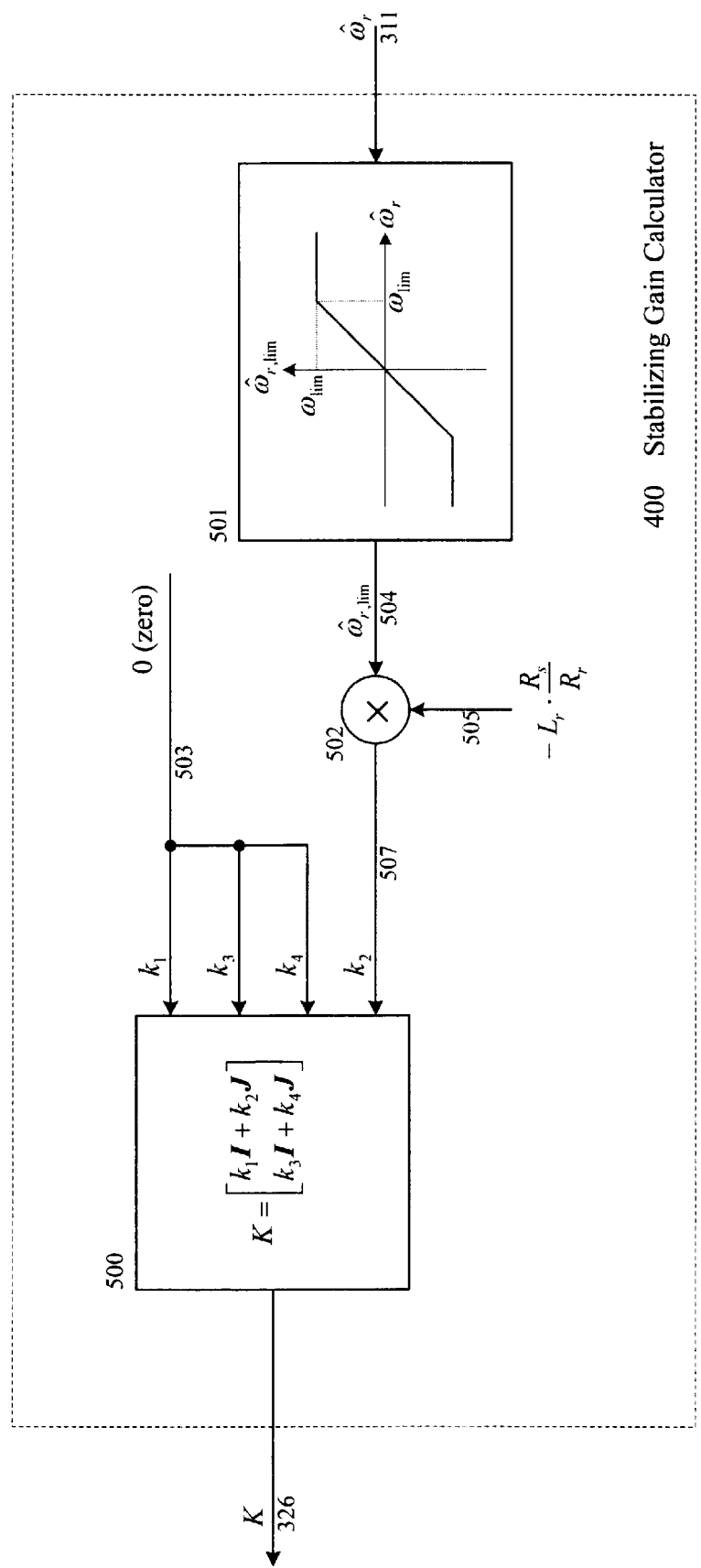
FIG. 5 exemplifies the simplest configuration of a stabilizing gain calculator.

FIG. 5 exemplifies the simplest configuration of the stabilizing gain calculator 400 shown in FIG. 4.

The stabilizing gain calculator 400 having the configuration shown in FIG. 5 sets the parameters $k_1$, $k_3$, and $k_4$ to 0 among the four parameters $k_1$ to $k_4$ of the feedback gain K 326, and obtains only the parameter $k_2$ from the estimated rotor speed 311.

Calculation of the parameter $k_2$ is made based on the equation (13). If an input absolute value of the estimated rotor speed 311 is equal to or larger than a limiter value $\omega_{lim}$, a limiter 501 clips the estimated rotor speed 311 to the limiter value $\omega_{lim}$ as represented by a graph of FIG. 5 to make the absolute value fall within the limiter value range, and outputs the clipped estimated rotor speed 311, in consideration of the case where the equation (10) is not satisfied due to the estimated rotor speed 311 used for the calculation, which is too high or low.

Then, a multiplier 502 multiplies this output value 504 and a fixed value $-L_r \cdot R_s / R_r$ 505, which is dependent on the standard parameters of the induction motor 100, to obtain the parameter $k_2$. An arithmetic operation unit 500 calculates the stabilization feedback gain K 326 from the parameter $k_2$ and the values 503 (all the values are 0) of $k_1$, $k_3$, and $k_4$, and outputs the feedback gain K 326.

As described above in detail, stable operations can be realized for global operating frequencies according to the present invention.

Additionally, since the procedures proposed to evaluate the feedback gain of an MRAS-based flux and speed observer are used, it become possible to overcome problems that are associated with a regenerative operation at a low speed even if a primary frequency approaches 0, which makes a flux and speed observer causes an error with a conventional method. As a result, global stable operations of the drive can be achieved.

Furthermore, a feedback gain the value of which does not become infinite can be derived even if the primary frequency approaches "0".

Still further, a stabilization gain can be obtained by solving a simple algebraic equation.

Still further, a feedback gain K is obtained as a very simple function of almost no motor parameters and operating speed. Therefore, the feedback gain K that ensures the stability of a flux and speed observer under every possible operating condition can be obtained without much degrading the dynamic characteristics of the observer. Accordingly, it is very easy to industrially realize and implement the present invention.

What is claimed is:

1. A control system vector-controlling an induction motor that does not comprise at least either a speed sensor or a position sensor, and is represented by a following equation, $$\begin{cases} \frac{d}{dt}\begin{pmatrix}\phi_s\\\phi_r\end{pmatrix} = \begin{pmatrix}-R_s L_{sg} I & R_s L_{mg} I\\ R_r L_{mg} I & -R_r L_{rg} I + \omega_r J\end{pmatrix}\cdot\begin{pmatrix}\phi_s\\\phi_r\end{pmatrix} + \begin{pmatrix}I\\0\end{pmatrix}\cdot v_s = Ax + Bu\\ i_s = (L_{sg}I - L_{mg}I)\cdot\begin{pmatrix}\phi_s\\\phi_r\end{pmatrix} = Cx\end{cases}$$

where $\phi_s = [\phi_{s\alpha}\ \phi_{s\beta}]^T$: space vectors associated with a stator flux;
$\phi_r = [\phi_{r\alpha}\ \phi_{r\beta}]^T$: space vectors associated with a rotor flux;
$i_s = [i_{s\alpha}\ i_{s\beta}]^T$: space vectors associated with a stator current;
$i_r = [i_{r\alpha}\ i_{r\beta}]^T$: space vectors associated with a stator voltage;

$$L_{sg} = \frac{1}{\sigma\cdot L_s} = \frac{L_r}{L_s\cdot L_r - L_m^2};$$

$$L_{rg} = \frac{1}{\sigma\cdot L_r} = \frac{L_s}{L_s\cdot L_r - L_m^2};$$

$$L_{mg} = \frac{1}{\sigma\cdot L_m} = \frac{L_m}{L_s\cdot L_r - L_m^2};$$

$$I = \begin{bmatrix}1 & 0\\0 & 1\end{bmatrix};\quad J = \begin{bmatrix}0 & -1\\1 & 0\end{bmatrix};\quad 0 = \begin{bmatrix}0 & 0\\0 & 0\end{bmatrix};$$

$R_s$, $R_r$: Stator and rotor resistance;
$L_s$, $L_r$, $L_m$: Stator, rotor, and mutual inductance;
$\sigma = 1 - L_m^2/(L_s\cdot L_r)$: Total leakage coefficient;
$\omega_r$: Angular rotor speed said control system comprising:
an observer unit determining a feedback gain K which stabilizes an equation of estimation error of an estimated stator current $e_i$, $$e_i = Ce = C(sI_4 - A - KC)^{-1}\begin{pmatrix}0\\-I\end{pmatrix}(-(\hat\omega_r - \omega_r)J\hat\phi_r)$$

$$= G_1(s)\cdot(-\Delta\omega_r J\phi_r)$$

where
values below the symbol ^ are observed values;
$C = [L_{sg}I - L_{mg}I]$;

$$A = \begin{bmatrix}A_{11} & A_{12}\\A_{21} & A_{22}\end{bmatrix};$$

$A_{11} = -R_s L_{sg}I$;
$A_{12} = R_s L_{mg}I$;
$A_{21} = R_r L_{mg}I$;
$A_{22} = -R_r L_{rg}I + \omega_r J$;
$e_i$: estimated stator current;
s: Laplace operator;
$G_l(s)$: linear transfer function;
and obtaining and outputting at least either of an observed flux and an estimated speed based on the feedback gain K; and
a control unit controlling the induction motor based on an output of said observer unit.

2. The control system according to claim 1, wherein said observer unit determines a value that satisfies $$\lim_{\omega\to 0} \angle G_l(j\omega) = \infty$$

where $\omega$ is primary frequency, and $\angle$ is a phase angle as a feedback gain K for a transfer function $G_l$ being a linear portion of a system of the estimation error of the stator current.

3. The control system according to claim 1, wherein said observer unit determines the feedback gain K based on a following equation $$k_{2C} = -L_r\cdot\frac{R_s}{R_r}\cdot\omega_r$$

$$K = \begin{pmatrix}k_{2C}J\\0\end{pmatrix}$$

where $L_r$ is a rotor inductance, $R_s$ is a stator resistance, $R_r$ is a rotor resistance, $\omega_r$ is an angular rotor speed, and $k_{2c}$ is a parameter of the feedback gain K and $$J = \begin{bmatrix}0 & -1\\1 & 0\end{bmatrix};\quad 0 = \begin{bmatrix}0 & 0\\0 & 0\end{bmatrix}.$$

4. The control system according to claim 1, wherein said observer unit determines the feedback gain K a magnitude of which is within a predetermined range if a rotation speed of the induction motor is equal to or higher than a preset value.

5. The control system according to claim 4, wherein said observer unit determines the feedback gain K by using a value of an angular rotor speed $\omega_r$, which is restricted to within a predetermined range.

6. The control system according to claim 1, wherein said control unit comprises
a vector rotating unit performing vector rotation based on the output of said observer unit, and
a current regulating unit outputting a current command to the induction motor based on the output of said observer unit.

7. A control system vector-controlling an induction motor that does not comprise at least either a speed sensor or a position sensor, and is represented by a following equation, $$\begin{cases} \dfrac{d}{dt}\begin{pmatrix}\phi_s\\\phi_r\end{pmatrix} = \begin{pmatrix}-R_sL_{sg}I & R_sL_{mg}I\\ R_rL_{mg}I & -R_rL_{rg}I+\omega_rJ\end{pmatrix}\cdot\begin{pmatrix}\phi_s\\\phi_r\end{pmatrix}+\begin{pmatrix}I\\0\end{pmatrix}\cdot v_s = Ax+Bu \\ i_s = (L_{sg}I - L_{mg}I)\cdot\begin{pmatrix}\phi_s\\\phi_r\end{pmatrix} = Cx \end{cases}$$

where $\phi_s = [\phi_{s\alpha}\ \phi_{s\beta}]^T$: space vectors associated with a stator flux;
$\phi_r = [\phi_{r\alpha}\ \phi_{r\beta}]^T$: space vectors associated with a rotor flux;
$i_s = [i_{s\alpha}\ i_{s\beta}]^T$: space vectors associated with a stator current;
$i_r = [i_{r\alpha}\ i_{r\beta}]^T$: space vectors associated with a stator voltage;

$$L_{sg} = \dfrac{1}{\sigma\cdot L_s} = \dfrac{L_r}{L_s\cdot L_r - L_m^2};$$

$$L_{rg} = \dfrac{1}{\sigma\cdot L_r} = \dfrac{L_s}{L_s\cdot L_r - L_m^2};$$

$$L_{mg} = \dfrac{1}{\sigma\cdot L_m} = \dfrac{L_m}{L_s\cdot L_r - L_m^2};$$

$$I = \begin{bmatrix}1 & 0\\ 0 & 1\end{bmatrix};\quad J = \begin{bmatrix}0 & -1\\ 1 & 0\end{bmatrix};\quad 0 = \begin{bmatrix}0 & 0\\ 0 & 0\end{bmatrix};$$

$R_s$, $R_r$: Stator and rotor resistance;
$L_s$, $L_r$, $L_m$: Stator, rotor, and mutual inductance;
$\sigma = 1 - L_m^2/(L_s\cdot L_r)$: Total leakage coefficient;
$\omega_r$: Angular rotor speed,
said control system comprising:
 observer means for determining a feedback gain K which stabilizes an equation of estimation error of an estimated stator current $e_i$, $$e_i = Ce = C(sI_4 - A - KC)^{-1}\begin{pmatrix}0\\ -I\end{pmatrix}(-(\hat{\omega}_r - \omega_r)J\hat{\phi}_r)$$

$$= G_1(s)\cdot(-\Delta\omega_r J\phi_r)$$

where
values below the symbol ^ are observed values;
$C = [L_{sg}I - L_{mg}I]$;

$$A = \begin{bmatrix}A_{11} & A_{12}\\ A_{21} & A_{22}\end{bmatrix};$$

$A_{11} = -R_sL_{sg}I$;
$A_{12} = R_sL_{mg}I$;
$A_{21} = R_rL_{mg}I$;
$A_{22} = -R_rL_{rg}I + \omega_r J$;
$e_i$: stator current;
s: Laplace operator;
$G_f(s)$: linear transfer function;
and for obtaining and outputting at least either of an observed flux and an estimated speed based on the feedback gain K; and
control means for controlling the induction motor based on an output of said observer means.

8. An observer used to vector-control an induction motor that does not comprise at least either a speed sensor or a position sensor, and is represented by a following equation, $$\begin{cases} \dfrac{d}{dt}\begin{pmatrix}\phi_s\\\phi_r\end{pmatrix} = \begin{pmatrix}-R_sL_{sg}I & R_sL_{mg}I\\ R_rL_{mg}I & -R_rL_{rg}I+\omega_rJ\end{pmatrix}\cdot\begin{pmatrix}\phi_s\\\phi_r\end{pmatrix}+\begin{pmatrix}I\\0\end{pmatrix}\cdot v_s = Ax+Bu \\ i_s = (L_{sg}I - L_{mg}I)\cdot\begin{pmatrix}\phi_s\\\phi_r\end{pmatrix} = Cx \end{cases}$$

where
$\phi_s = [\phi_{s\alpha}\ \phi_{s\beta}]^T$: space vectors associated with a stator flux;
$\phi_r = [\phi_{r\alpha}\ \phi_{s\beta}]^T$: space vectors associated with a rotor flux;
$i_s = [i_{s\alpha}\ i_{s\beta}]^T$: space vectors associated with a stator current;
$i_r = [i_{r\alpha}\ i_{r\beta}]^T$: space vectors associated with a stator voltage;

$$L_{sg} = \dfrac{1}{\sigma\cdot L_s} = \dfrac{L_r}{L_s\cdot L_r - L_m^2};$$

$$L_{rg} = \dfrac{1}{\sigma\cdot L_r} = \dfrac{L_s}{L_s\cdot L_r - L_m^2};$$

$$L_{mg} = \dfrac{1}{\sigma\cdot L_m} = \dfrac{L_m}{L_s\cdot L_r - L_m^2};$$

$$I = \begin{bmatrix}1 & 0\\ 0 & 1\end{bmatrix};\quad J = \begin{bmatrix}0 & -1\\ 1 & 0\end{bmatrix};\quad 0 = \begin{bmatrix}0 & 0\\ 0 & 0\end{bmatrix};$$

$R_s$, $R_r$: Stator and rotor resistance;
$L_s$, $L_r$, $L_m$: Stator, rotor, and mutual inductance;
$\sigma = 1 - L_m^2/(L_s\cdot L_r)$: Total leakage coefficient;
$\omega_r$: Angular rotor speed,
said observer comprising:
 a feedback gain determining unit determining a feedback gain K which stabilizes an equation of estimation error of an estimated stator current $e_i$, $$e_i = Ce = C(sI_4 - A - KC)^{-1}\begin{pmatrix}0\\ -I\end{pmatrix}(-(\hat{\omega}_r - \omega_r)J\hat{\phi}_r)$$

$$= G_1(s)\cdot(-\Delta\omega_r J\phi_r)$$

where
values below the symbol ^ are observed values;
$C = [L_{sg}I - L_{mg}I]$;

$$A = \begin{bmatrix}A_{11} & A_{12}\\ A_{21} & A_{22}\end{bmatrix};$$

$A_{11} = -R_sL_{sg}I$;
$A_{12} = R_sL_{mg}I$;
$A_{21} = R_rL_{mg}I$;
$A_{22} = -R_rL_{rg}I + \omega_r J$;
$e_i$: estimated stator current;
s: Laplace operator;
$G_f(s)$: linear transfer function; and
an outputting unit obtaining and outputting at least either of an observed flux and an estimated speed based on the feedback gain K.

9. The observer according to claim 8, wherein said feedback gain determining unit determines the feedback gain a magnitude of which is within a predetermined range if a rotation speed of the induction motor is equal to or higher than a preset value.

10. An observer used to vector-control an induction motor that does not comprise at least either a speed sensor or a position sensor, and is represented by a following equation, $$\begin{cases} \dfrac{d}{dt}\begin{pmatrix}\phi_s\\\phi_r\end{pmatrix} = \begin{pmatrix}-R_sL_{sg}I & R_sL_{mg}I\\ R_rL_{mg}I & -R_rL_{rg}I+\omega_r J\end{pmatrix}\cdot\begin{pmatrix}\phi_s\\\phi_r\end{pmatrix}+\begin{pmatrix}I\\0\end{pmatrix}\cdot v_s = Ax+Bu\\ i_s = (L_{sg}I - L_{mg}I)\cdot\begin{pmatrix}\phi_s\\\phi_r\end{pmatrix} = Cx\end{cases}$$

where $\phi_s=[\phi_{s\alpha}\ \phi_{s\beta}]^T$: space vectors associated with a stator flux;
$\phi_r=[\phi_{r\alpha}\ \phi_{r\beta}]^T$: space vectors associated with a rotor flux;
$i_s=[i_{s\alpha}\ i_{s\beta}]^T$: space vectors associated with a stator current;
$i_r=[i_{r\alpha}\ i_{r\beta}]^T$: space vectors associated with a stator voltage;

$$L_{sg} = \frac{1}{\sigma\cdot L_s} = \frac{L_r}{L_s\cdot L_r - L_m^2};$$

$$L_{rg} = \frac{1}{\sigma\cdot L_r} = \frac{L_s}{L_s\cdot L_r - L_m^2};$$

$$L_{mg} = \frac{1}{\sigma\cdot L_m} = \frac{L_m}{L_s\cdot L_r - L_m^2};$$

$$I = \begin{bmatrix}1 & 0\\0 & 1\end{bmatrix};\quad J = \begin{bmatrix}0 & -1\\1 & 0\end{bmatrix};\quad 0 = \begin{bmatrix}0 & 0\\0 & 0\end{bmatrix};$$

$R_s$, $R_r$: Stator and rotor resistance;
$L_s$, $L_r$, $L_m$: Stator, rotor, and mutual inductance;
$\sigma=1-L_m^2/(L_s\cdot L_r)$: Total leakage coefficient;
$\omega_r$: Angular rotor speed,
said observer comprising:
  feedback gain determining means for determining a feedback gain K which stabilizes an equation of estimation error of an estimated stator current $e_i$, $$e_i = Ce = C(sI_4 - A - KC)^{-1}\begin{pmatrix}0\\-I\end{pmatrix}(-(\hat{\omega}_r-\omega_r)J\hat{\phi}_r)$$
$$= G_1(s)\cdot(-\Delta\omega_r J\phi_r)$$

where
values below the symbol ^ are observed values;
$C=[L_{sg}I-L_{mg}I]$;

$$A = \begin{bmatrix}A_{11} & A_{12}\\A_{21} & A_{22}\end{bmatrix};$$

$A_{11}=-R_sL_{sg}I$;
$A_{12}=R_sL_{mg}I$;
$A_{21}=R_rL_{mg}I$;
$A_{22}=-R_rL_{rg}I+\omega_r J$;
$e_i$: stator current;
s: Laplace operator;
$G_f(s)$: linear transfer function; and
  outputting means for obtaining and outputting at least either of an observed flux and an estimated speed based on the feedback gain K.

11. A method vector-controlling an induction motor that does not comprise at least either a speed sensor or a position sensor, and is represented by a following equation, $$\begin{cases} \dfrac{d}{dt}\begin{pmatrix}\phi_s\\\phi_r\end{pmatrix} = \begin{pmatrix}-R_sL_{sg}I & R_sL_{mg}I\\ R_rL_{mg}I & -R_rL_{rg}I+\omega_r J\end{pmatrix}\cdot\begin{pmatrix}\phi_s\\\phi_r\end{pmatrix}+\begin{pmatrix}I\\0\end{pmatrix}\cdot v_s = Ax+Bu\\ i_s = (L_{sg}I - L_{mg}I)\cdot\begin{pmatrix}\phi_s\\\phi_r\end{pmatrix} = Cx\end{cases}$$

where $\phi_s=[\phi_{s\alpha}\ \phi_{s\beta}]^T$: space vectors associated with a stator flux;
$\phi_r=[\phi_{r\alpha}\ \phi_{r\beta}]^T$: space vectors associated with a rotor flux;
$i_s=[i_{s\alpha}\ i_{s\beta}]^T$: space vectors associated with a stator current;
$i_r=[i_{r\alpha}\ i_{r\beta}]^T$: space vectors associated with a stator voltage;

$$L_{sg} = \frac{1}{\sigma\cdot L_s} = \frac{L_r}{L_s\cdot L_r - L_m^2};$$

$$L_{rg} = \frac{1}{\sigma\cdot L_r} = \frac{L_s}{L_s\cdot L_r - L_m^2};$$

$$L_{mg} = \frac{1}{\sigma\cdot L_m} = \frac{L_m}{L_s\cdot L_r - L_m^2};$$

$$I = \begin{bmatrix}1 & 0\\0 & 1\end{bmatrix};\quad J = \begin{bmatrix}0 & -1\\1 & 0\end{bmatrix};\quad 0 = \begin{bmatrix}0 & 0\\0 & 0\end{bmatrix};$$

$R_s$, $R_r$: Stator and rotor resistance;
$L_s$, $L_r$, $L_m$: Stator, rotor, and mutual inductance;
$\sigma=1-L_m^2/(L_s\cdot L_r)$: Total leakage coefficient;
$\omega_r$: Angular rotor speed,
said method comprising the steps of:
  determining a feedback gain K which stabilizes an equation of estimation error of an estimated stator current $e_i$, $$e_i = Ce = C(sI_4 - A - KC)^{-1}\begin{pmatrix}0\\-I\end{pmatrix}(-(\hat{\omega}_r-\omega_r)J\hat{\phi}_r)$$
$$= G_1(s)\cdot(-\Delta\omega_r J\phi_r)$$

where
values below the symbol ^ are observed values;
$C=[L_{sg}I-L_{mg}I]$;

$$A = \begin{bmatrix}A_{11} & A_{12}\\A_{21} & A_{22}\end{bmatrix};$$

$A_{11}=-R_sL_{sg}I$;
$A_{12}=R_sL_{mg}I$;
$A_{21}=R_rL_{mg}I$;
$A_{22}=-R_rL_{rg}I+\omega_r J$;
$e_i$: stator current;
s: Laplace operator;
$G_f(s)$: linear transfer function; and
  obtaining at least either of an observed flux and an estimated speed based on the feedback gain K.

12. The method according to claim 11, wherein the feedback gain a magnitude of which is within a predetermined range if a rotation speed of the induction motor is equal to or higher than a preset value.

* * * * *

UNITED STATES PATENT AND TRADEMARK OFFICE
CERTIFICATE OF CORRECTION

PATENT NO.    : 6,518,722 B1
DATED         : February 11, 2003
INVENTOR(S)   : Giuseppe It is certified that error appears in the above-identified patent and that said Letters Patent is hereby corrected as shown below:

Column 9,
Line 29, insert a solid line between the upper and lower equation as shown below:

$$\begin{cases} \dfrac{d}{dt}\begin{pmatrix} \phi_s \\ \phi_r \end{pmatrix} = \begin{pmatrix} -R_s L_{sg} I & R_s L_{mg} I \\ R_r L_{mg} I & -R_r L_{rg} I + \omega_r J \end{pmatrix} \cdot \begin{pmatrix} \phi_s \\ \phi_r \end{pmatrix} + \begin{pmatrix} I \\ 0 \end{pmatrix} \cdot v_s = Ax + Bu \\ \hline i_s = (L_{sg} I - L_{mg} I) \cdot \begin{pmatrix} \phi_s \\ \phi_r \end{pmatrix} = Cx \end{cases}$$

Column 10,
Line 13, delete "estimated stator current" and insert -- estimation error of an estimated stator current --.

Column 11,
Line 3, insert a solid line between the upper and lower equation as shown below:

$$\begin{cases} \dfrac{d}{dt}\begin{pmatrix} \phi_s \\ \phi_r \end{pmatrix} = \begin{pmatrix} -R_s L_{sg} I & R_s L_{mg} I \\ R_r L_{mg} I & -R_r L_{rg} I + \omega_r J \end{pmatrix} \cdot \begin{pmatrix} \phi_s \\ \phi_r \end{pmatrix} + \begin{pmatrix} I \\ 0 \end{pmatrix} \cdot v_s = Ax + Bu \\ \hline i_s = (L_{sg} I - L_{mg} I) \cdot \begin{pmatrix} \phi_s \\ \phi_r \end{pmatrix} = Cx \end{cases}$$

Line 56, delete "stator current" and insert -- estimation error of an estimated stator current --.

UNITED STATES PATENT AND TRADEMARK OFFICE
CERTIFICATE OF CORRECTION

PATENT NO.     : 6,518,722 B1
DATED          : February 11, 2003
INVENTOR(S)    : Giuseppe It is certified that error appears in the above-identified patent and that said Letters Patent is hereby corrected as shown below:

Column 12,
Line 5, insert a solid line between the upper and lower equation as shown below:

$$\begin{cases} \dfrac{d}{dt}\begin{pmatrix}\phi_s \\ \phi_r\end{pmatrix} = \begin{pmatrix} -R_s L_{sg} I & R_s L_{mg} I \\ R_r L_{mg} I & -R_r L_{rg} I + \omega_r J \end{pmatrix} \cdot \begin{pmatrix}\phi_s \\ \phi_r\end{pmatrix} + \begin{pmatrix} I \\ 0 \end{pmatrix} \cdot v_s = Ax + Bu \\ \hline i_s = (L_{sg} I - L_{mg} I) \cdot \begin{pmatrix}\phi_s \\ \phi_r\end{pmatrix} = Cx \end{cases}$$

Line 11, delete "$\phi_r = \begin{bmatrix}\phi_{r\alpha} & \phi_{s\beta}\end{bmatrix}^T$" and insert -- $\phi_r = \begin{bmatrix}\phi_{r\alpha} & \phi_{r\beta}\end{bmatrix}^T$ --.

Line 54, delete "estimated stator current" and insert -- estimation error of an estimated stator current --.

Column 13,
Line 5, insert a solid line between the upper and lower equation as shown below:

$$\begin{cases} \dfrac{d}{dt}\begin{pmatrix}\phi_s \\ \phi_r\end{pmatrix} = \begin{pmatrix} -R_s L_{sg} I & R_s L_{mg} I \\ R_r L_{mg} I & -R_r L_{rg} I + \omega_r J \end{pmatrix} \cdot \begin{pmatrix}\phi_s \\ \phi_r\end{pmatrix} + \begin{pmatrix} I \\ 0 \end{pmatrix} \cdot v_s = Ax + Bu \\ \hline i_s = (L_{sg} I - L_{mg} I) \cdot \begin{pmatrix}\phi_s \\ \phi_r\end{pmatrix} = Cx \end{cases}$$

Line 53, delete "stator current" and insert -- estimation error of an estimated stator current --.

UNITED STATES PATENT AND TRADEMARK OFFICE
CERTIFICATE OF CORRECTION

PATENT NO. : 6,518,722 B1
DATED : February 11, 2003
INVENTOR(S) : Giuseppe

It is certified that error appears in the above-identified patent and that said Letters Patent is hereby corrected as shown below:

Column 14,
Line 5, insert a solid line between the upper and lower equation as shown below:

$$\begin{cases} \dfrac{d}{dt}\begin{pmatrix}\phi_s \\ \phi_r\end{pmatrix} = \begin{pmatrix} -R_s L_{sg} I & R_s L_{mg} I \\ R_r L_{mg} I & -R_r L_{rg} I + \omega_r J \end{pmatrix} \cdot \begin{pmatrix}\phi_s \\ \phi_r\end{pmatrix} + \begin{pmatrix} I \\ 0 \end{pmatrix} \cdot v_s = Ax + Bu \\ i_s = (L_{sg} I - L_{mg} I) \cdot \begin{pmatrix}\phi_s \\ \phi_r\end{pmatrix} = Cx \end{cases}$$

Line 57, delete "stator current" and insert -- estimation error of an estimated stator current --.

Signed and Sealed this

Nineteenth Day of August, 2003

JAMES E. ROGAN
*Director of the United States Patent and Trademark Office*